United States Patent [19]

Dusette et al.

[11] Patent Number: 4,457,647
[45] Date of Patent: Jul. 3, 1984

[54] RE-ROUNDING DEFLECTED UNDERGROUND PLASTIC PIPE AND REMEDYING OVER BELLING AND FAULTY GRADING THEREOF

[75] Inventors: Don L. Dusette, Santa Barbara; Charles L. Buchert, Santa Maria, both of Calif.

[73] Assignee: Con-Prod, Inc., Santa Maria, Calif.

[21] Appl. No.: 436,787

[22] Filed: Oct. 26, 1982

[51] Int. Cl.³ .......................... F16L 1/00; F16L 55/18
[52] U.S. Cl. .................. 405/154; 138/97; 405/156
[58] Field of Search ............... 405/154, 182; 166/177; 37/DIG. 18; 175/55, 56; 299/14; 172/40

[56] References Cited

U.S. PATENT DOCUMENTS

| | | | |
|---|---|---|---|
| 2,730,176 | 1/1956 | Herbold | 166/177 |
| 2,743,090 | 4/1956 | Malan | 166/177 UX |
| 3,231,025 | 1/1966 | Bodine | 405/182 X |
| 3,543,377 | 12/1970 | Bremner | 405/154 X |
| 3,602,263 | 8/1971 | Bremner | 405/154 |
| 3,770,054 | 11/1973 | Solum | 166/177 |
| 3,948,329 | 4/1976 | Cummings | 405/182 X |
| 4,309,128 | 1/1982 | Williams | 405/154 |

*Primary Examiner*—Dennis L. Taylor
*Attorney, Agent, or Firm*—Owen, Wickersham & Erickson

[57] ABSTRACT

Re-rounding generally horizontally installed, covered, below-ground flexible conduits with eccentrically deflected upper walls, correcting over-belling, and obtaining primary compaction of soil in the vicinity of the conduits. A casing assembly has a central cylindrical tubular gauging portion nearly filling the conduit diameter, a tapered forward nose portion welded thereto and an off-center smaller-diameter cylindrical tubular rear portion welded thereto and providing continuity along the bottom of said casing assembly but recessed at the top and sides. An air-jet-driven ball-type vibrator is rigidly secured to the bottom of the rear portion, and is actuated by air through an inlet tangentially to the vibrator. This assembly is drawn slowly through the pipe at a substantially constant pull force no greater than 1500 pounds, and preferably no faster than ½ foot per second, and the bottom wall of the rear portion is vibrated, when desired, in a substantially vertical plane, so as to compact the soil below the pipe and to each side near the bottom while also strengthening the soil arch above the pipe. In some uses water is flowed downstream around and past the apparatus during this time.

7 Claims, 5 Drawing Figures

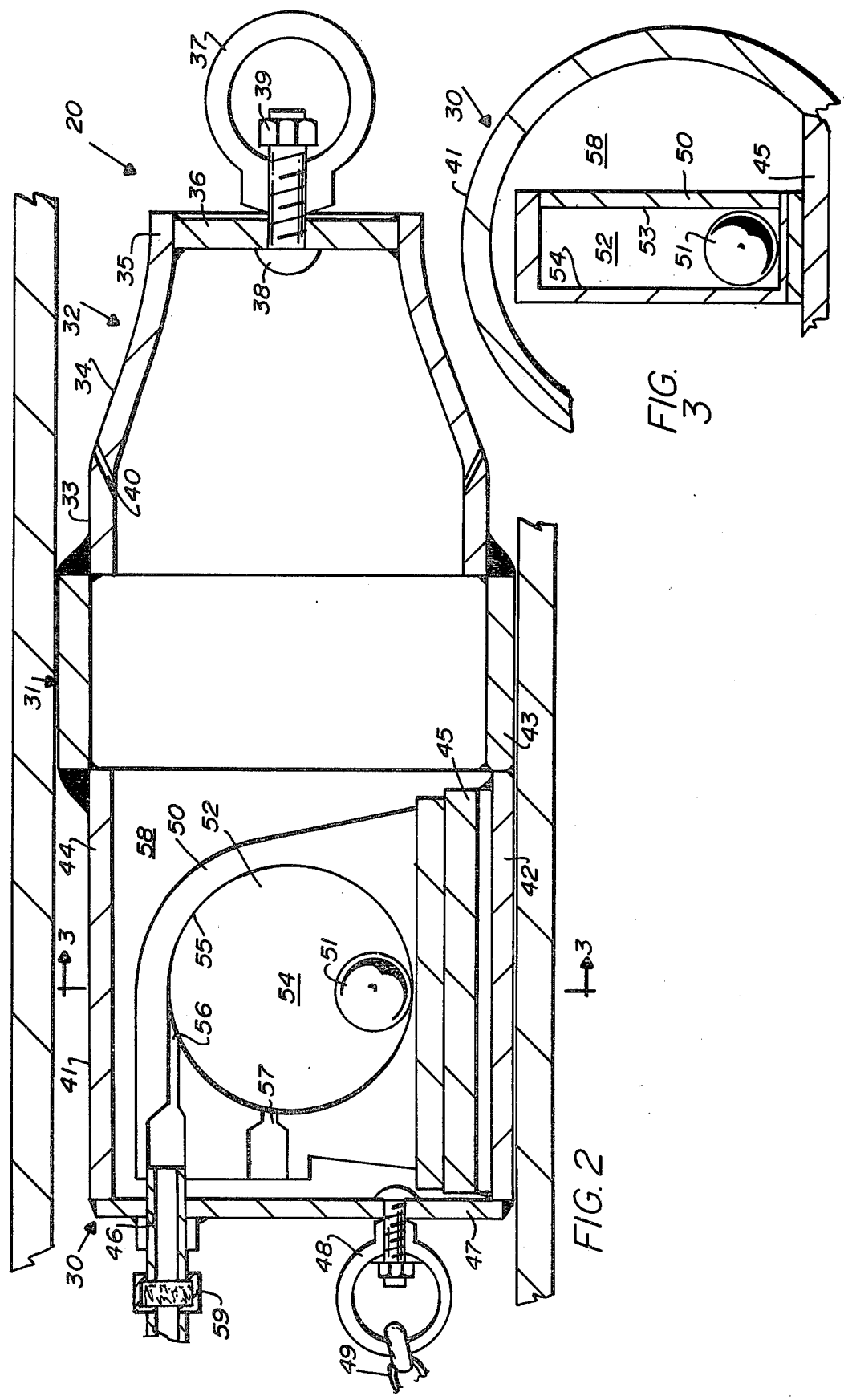

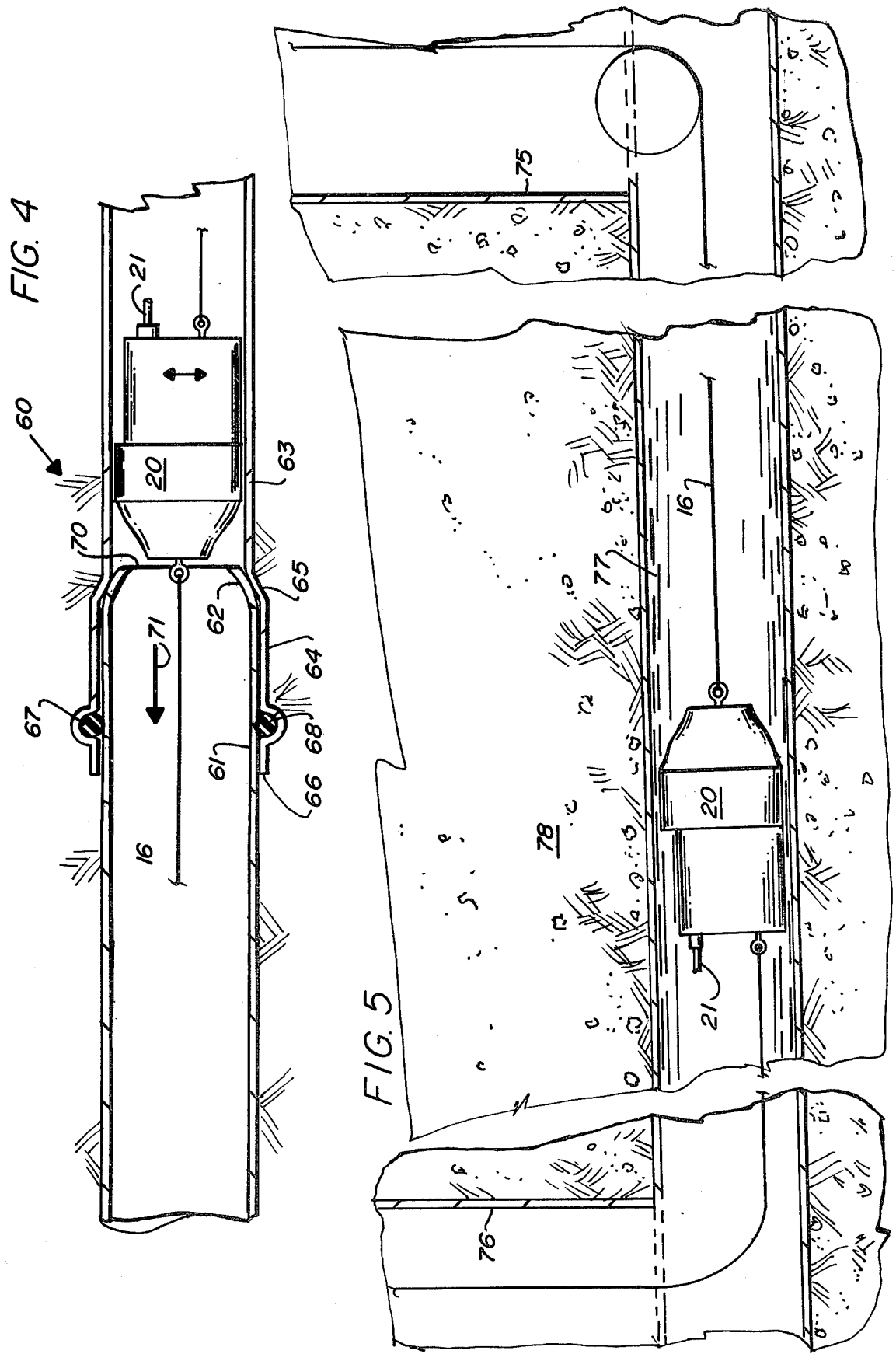

RE-ROUNDING DEFLECTED UNDERGROUND PLASTIC PIPE AND REMEDYING OVER BELLING AND FAULTY GRADING THEREOF

This invention relates to improvements in method and apparatus for re-rounding deflected plastic sewer pipes, for correcting over-belled pipe joints, and for correcting misalignment due to improper grading or compaction.

BACKGROUND OF THE INVENTION

The invention relates to overcoming three types of problems relates to the use of sewer pipes made of flexible plastic, such as polyvinly chloride, that are placed underground in a trench and covered.

First, it is not rare for such pipes to be forced out of round by improper compaction of the soil in the trench which forces the weight of the soil and other filler material that is piled on top of the pipe when filling the trench to force in the somewhat flexible pipe wall. Government regulations of various jurisdiction vary as to amount of out-of-roundness which can be tolerated, the variation being between about 3% and 10%, but they are substantially universal in requiring that there be very little eccentricity in the pipe.

There have been some devices used to test for out-of-roundness by pulling the device through the string of pipe after backfill and compaction of the material in the trenches have been completed. If the device passes through satisfactorily, the pipe is adequately round. When the pipe is over-deflected, however, the device will not pass through and fails this test. The contractor would be subjected to heavy costs if he were to have to dig up the entire line of pipe and rework or replace the bedding material.

A recently-issued U.S. Pat. No. 4,309,128 describes one apparatus which has as its purpose the solving of this problem of deflection of plastic pipe. This patent, by Richard L. Williams, comprises a cylindrical device, possibly with a tapered nose, which can be pulled through the pipe and which includes an eccentrically mounted weight on a shaft which projects from an air motor. This eccentric weight sets up vibrations inside the cylindrical housing, and the vibrations are transmitted to the housing all around its circumference. These vibrations are said to act to change the soil compaction in such a way as to cause, at least in many instances, the relief of pressure on the top and sides of the pipe, so that the pipe can restore itself to round.

While in that invention the vibrations are in all directions, we have found that it is very important to concentrate or confine the vibrations to substantially the longitudinal vertical plane. This confining produces far better results, both in costs and in relieving the pressure on the top of the pipe. The device of this invention transmits the internal vibration and related forces through the pipe wall, primarily at the top and bottom of the pipe, and the vibration is smallest at the sides of the pipe. These predominantly vertical vibrations compact the filler material beneath the pipe, while at the same time causing a type of compaction above the pipe, forming what is known as a soil arch spaced above the crown of the pipe. This soil arch relieves the pipe from supporting some of the downward pressure of the soil above the soil arch and provides some support itself in that soil. Thus, the present invention is able to re-round over-deflected pipe and to help maintain pipe roundness by providing this "soil arch" above the top of the pipe, as well as by acting on the fill at the sides and bottom of the pipe and so providing the needed support in the soil.

The device of this invention also acts as a gauge to determine the acceptability of the pipe line, including the freedom from substantial deflection, without having to use, in addition, some other gauging device. Only one pass of the device of this invention is needed to accomplish all that is required. Moreover, the device's vibrator need not be operated all the time but only when the device meets resistance to its being pulled through, indicating the approach of over-deflection or actual over-deflection.

The second problem to which this invention relates is that known as "over-belling". The pipe is typically made with a bell and spigot joint. The bell is an end portion which is larger in diameter than the remainder of the pipe; the spigot is simply the other end of the pipe. The spigot of one pipe section is inserted in the bell of a preceding pipe section, which also typically has an annular recess holding a rubber sealing gasket. With clay or concrete or asbestos-cement pipe, the spigot end is rigid, so that "over-belling" is not possible, for the spigot can be inserted only so far. However, plastic pipe, typically polyvinyl chloride, is stress-relievable. The spigot can be forced into the bell beyond the point where the bell ends in a short tapered portion that joins the bell to the cylindrical remainder of the pipe proper; when forced beyond that point, the spigot end deforms under force turning conically inwardly and protruding into the pipe proper. When this happens, the inwardly deformed portion of the spigot reduces the pipe diameter and so obstructs flow. It also prevents the passage of the pipe-roundness testing device or gauge and may result in rejection of the pipeline by the government agency concerned.

We have found that over-belling can be corrected by pulling the vibrating device of this invention toward and against the protruding portion of the spigot of an overbelled joint, the pulling being done at constant force; the tendency of the pipe material to resume its original shape is helped by the vertical vibration (and sometimes by actual contact and pushing) to force the spigot back to its proper position. This is important because, typically, failure of the pipeline to pass the roundness test is due about 40% of the time to over-belling at one or more joint, rather than to other causes. It is nearly as significant a problem as that of deflection due to improper compaction of the trench-filling material.

A third problem results from improper grading or compaction of the bottom of the trench in which the pipe is laid. Uniformity of grade is important in order to insure even flow of liquid through the pipeline. Uneveness of grade causes the line of pipe to go somewhat up and down from section to section. This results in failure of the pipe to meet some other tests that are often used to determine whether sewer pipe has been properly installed, namely, the test of its ability to pass a beam of light from one end of a pipeline to the other and the test of passing a closed-circuit television inspection. In this instance, vibration alone may not solve the problem, but we have found that if, while the device is pulled through the pipe at constant force, and from downstream to upstream, water is flowed downstream around the unit, the vibratory effects causing compaction of the trench bottom can be maximized.

Thus, the invention helps to test for pipe roundness, to restore roundness in deflected pipe, to achieve integrity at the joints, and to correct minor unevenness of grade, so as to assure long pipe life and safety and even flow of liquid through the pipeline when it is in service.

Further, the invention aids in removing debris from the pipe interior, as will be explained later.

Thus, among the objects of the invention are to provide method and apparatus for enabling contractors to comply with sewer roundness and alignment test; to provide plastic pipe sewers which are properly round; to re-round over-deflected pipe; to provide a deflection gauge to determine whether installed pipe is acceptable as to roundness; to act as a cleaning aid for the pipe line ahead of the compactor unit from dirt and other foreign matter; to provide the top, side, and bottom support required for proper action of the sewer pipe over a long period; to solve the problem of relieving over-belled pipelines; and to help to remove sags in the pipeline gradients.

Other objects and advantages of the invention will appear from the following description and drawings of a preferred embodiment of the invention.

SUMMARY OF THE INVENTION

The invention provides a pneumatically powered pipe gauge and vibrator, which, in combination with a constant pulling force and contact with the bottom of the inside of a flexible plastic conduit, provides and enhances soil compaction in the pipe zone and the trench fill sections. It also provides an economical method for re-rounding over-deflected plastic conduits and maintains pipe roundness by the establishment of proper side support for the conduits, due to compaction of the pipe zone soil. It further repositions over-belled or over-assembled pipes, a major cause of field failure to pass the "roundness" test, working the pipe joints to their correct position. The device acts as its own test gauge to determine acceptability of a sewer line.

The invention can also be used as a primary compaction aid to establish side support for the pipe and in the trench-fill section of properly installed and undeflected pipe. For this use, as said, it is preferred to pull the device upstream while having water flow around the unit, enabling the device to transmit maximum vibratory effects through to the pipe walls and into the soil medium.

In the method of the invention, vibration in a longitudinal vertical plane is engendered inside the device, the vibrations being generated in a vertical plane and in such a manner as to act on the bottom and top of the pipe, giving a more stable bottom support and a compacted soil arch spaced above the pipe. While the device need not be activated during its movement through the pipe except where the pipe is not properly round or is over-belled, the device can be used as a test gauge throughout the length of the pipeline. The device, when activated, should be pulled at no more than ½ foot per second anywhere for optimum results, and should be slowed down when an obstruction is encountered, in order to maintain a generally constant force of no more than 1500 pounds during the time it is being worked through a problem area.

The device includes a casing assembly which has a central cylindrical tubular portion, a forward tapered nose portion, and a narrower rear portion located off-center with respect to the central portion, the assembly providing continuity along the bottom of the casing assembly, but the rear portion being spaced down from the top of the central portion and in from the sides. The nose portion has an end wall with a pull ring and also is provided with a series of openings extending out at about 14° to the longitudinal axis of the device. Inside the offset, narrower rear portion is an air-jet-driven ball-type vibrator. This vibrator has an interior housing with a circular flat disc-like chamber enclosed by substantially flat vertical side wall portions, the chamber extending lengthwise of the apparatus. The chamber has a tangential inlet parallel to the longitudinal axis of the casing assembly and a longitudinally extending outlet facing the rear wall. The air passes around the inner periphery of the chamber and then flows out the outlet and around the outside of the vibrator, flowing through the casing assembly up to the front and then goes out through angled openings in the nose, thereby helping to clean the pipe and keep it clean of dirt and debris ahead of the progress of the device. The vibrator is secured to a support plate and welded to the bottom of the housing. Inside the chamber is a steel ball that is moved around the inner periphery of the chamber by the air coming in through the air inlet, its changes in position resulting in rapidly repeated vibrations in a longitudinal vertical plane. The vibrations are transmitted by the device and through the support plate to the bottom of the pipe.

IN THE DRAWINGS

FIG. 2 is a view on an enlarged scale and in vertical section of the vibratory device of FIG. 1.

FIG. 3 is a view taken along the line 3—3 in FIG. 2.

FIG. 4 is a view on an enlarged scale relative to FIG. 1 showing an over-belled joint being corrected by a device embodying the invention.

FIG. 5 is a view similar to FIG. 1 showing how primary compaction of the bottom portion of a trench, after fill, is done with the aid of water.

DESCRIPTION OF A PREFERRED EMBODIMENT

Figure 1:
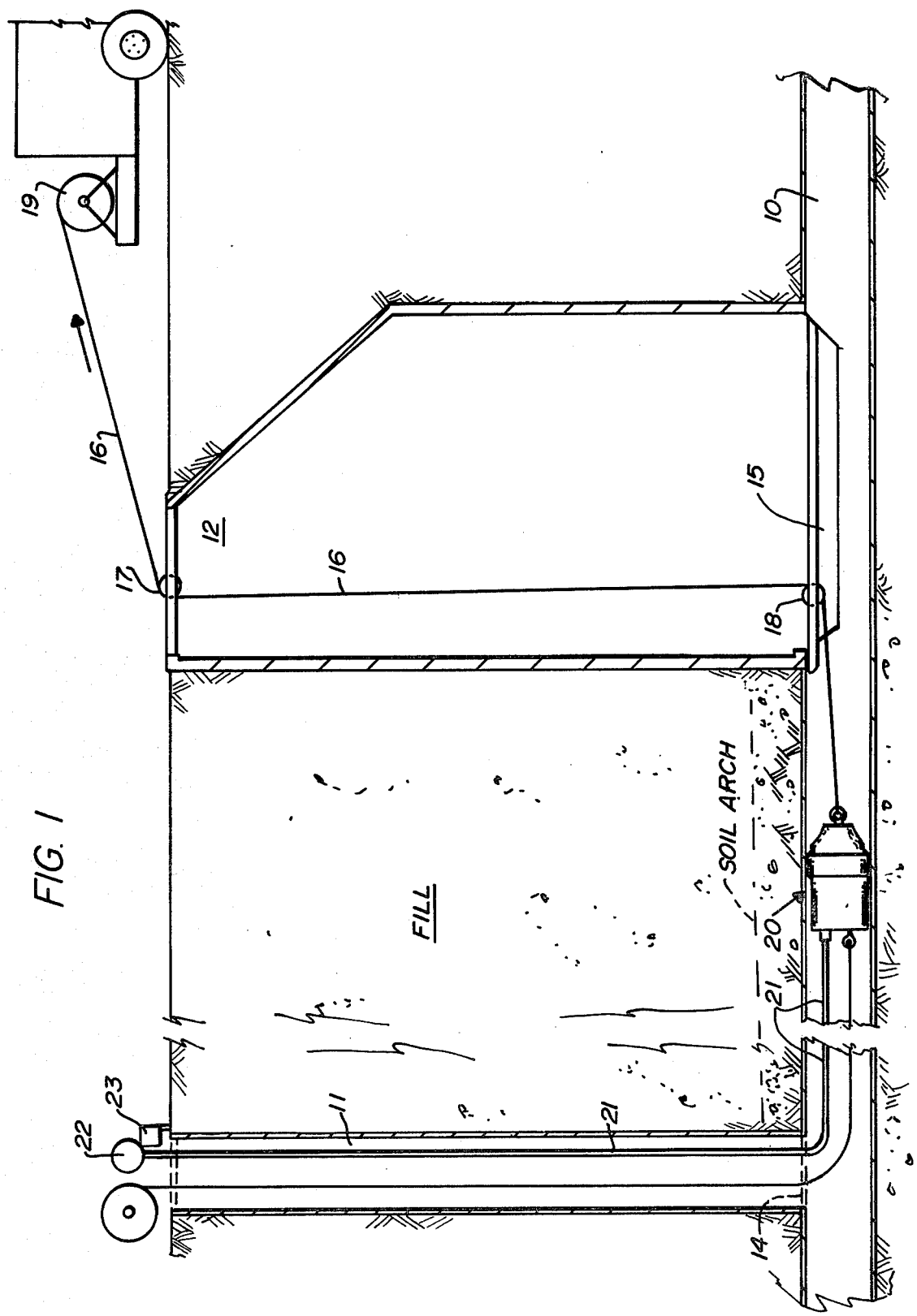
FIG. 1 is a somewhat diagrammatic view of a portion of installed pipe showing apparatus embodying the principles of the invention being pulled through a pipe.

FIG. 1 shows a line of plastic pipe 10 extending underground with manholes 11, 12, etc. at suitable intervals. At each manhole there is an opening 14, 15, etc. in the pipe, so that a cable 16 can be dropped and secured to a device 20 embodying the principles of the invention. Thus, in the manhole 12 there is a pulley 17 at the top, and a pulley 18 at the bottom, and from the pulley 17 at the top the cable 16 passes to a suitable winch 19.

From the other manhole 11 comes an air hose 21 which is attached to the device 20, so that as the device 20 is pulled through the pipe 10, it is provided with the air needed for vibration, as by a three-quarter-inch or five-eights-inch flexible hose 21, which is connected to a 125-cubic-feet per minute compressor 22 or other suitable device. Preferably an automatic drip oiler 23 is employed at the compressor 22 and great care is taken to make sure that the air hose 21 is completely clean and that the device 20 is clear of dirt and debris.

FIGS. 2 and 3 show the vibrating and gauging device 20 itself. This comprises a housing 30 having a central cylindrical gauging portion 31 which has an outer periphery close enough to the desired internal pipe diameter to serve as a roundness-testing gauge. If this gauging portion 31 successfully passes through the pipe 10, the pipe 10 should be approved by the government authority concerned, for it is made to meet and exceed any of the government standards concerned.

To the forward end of this cylindrical gauging portion 31 is secured a reduced-size forward portion 32, which has a tapered shape. Thus, it may have a short cylindrical portion 33 welded concentrically to the central portion 31 followed by a frustoconical or otherwise tapered portion 34 leading to a short cylindrical end section 35, which in turn is closed by a substantially vertical end plate 36. Attached to the vertical end plate 36 is a pull ring 37, which in turn is to be attached to the cable. The ring 37 may be attached by a bolt 38 and a nut 39, as shown. There is a series of openings 40, preferably a circumferential series and preferably located near the juncture of the tapered portion 34 with the forward end of the reduced-diameter cylindrical portion 33. The openings 40 are preferably inclined at an angle of about 14° to the longitudinal axis of the device 20. Through these, air is expelled which is used to clean the pipe ahead of the device 20 as it is being pulled through.

To the rear of the central gauging portion 31 is an off-center narrower portion 41, which may be cylindrical, if desired, but if so is smaller in diameter than the gauging portion 31. Its bottom 42 is completely in line with the bottom 43 of the cylindrical portion 31, but the top 44 of the portion 41 is substantially inset from the top of the portion 31, and the sides are also inset. Within this portion 41, a support member 45 is mounted, preferably by welding, as a chord near the bottom so that it is in direct contact with the lower part of the portion 41, for transmission of vibration to the bottom wall arc 42. An end closure 47 for the portion 41 is provided having an air inlet 46 near its upper end, and there is an attachment ring 48 for a cable 49 below the air inlet 46, preferably between the lower wall 42 and the axial center.

Inside this portion 41 is preferably mounted a suitable air-jet-operated, ball-type vibrator 50 such as is made by SSP Construction Equipment, Inc. and sold under the name Viber External Vibrator, a suitable size and model being selected for the device. We have found that the model A8, which has a steel ball 51 one inch in diameter, is suitable. To obtain 100 p.s.i., passage of 15 cubic feet of air per minute is required, and for 80 p.s.i., 12 cubic feet per minute. The ball 51 requires 25 p.s.i. to start operation when the unit 50 is in its proper veritcal position and the RPM is approximately 7,700, resulting in corresponding cyclic vibration in the vertical plane.

The vibrator 50 has a disc-like chamber 52 with flat side walls 53 and 54 (FIG. 3) and a round periphery 55 with a tangential inlet 56 near its upper end an an outlet 57 near its center. The steel ball 51 is about one-third the diameter of the chamber 52 and normally rests on the bottom. When air in suitable amount and pressure is put into the tangential inlet 56, the ball 51 is driven around the circular periphery 55 to provide substantial force as well as actual movement and vibration in a vertical plane.

The air expelled from the vibrator 50 passes through the outlet 57 into a chamber 58 inside the main housing 30 and is ejected through the nozzle-like inclined outlet openings 40 through the front portion 33.

To be sure that the air entering the chamber 52 is clean, an air filter 59 is provided ahead of the inlet 56. For this purpose, the air filter 59 may be an in-line pneumatic filter of the type used with many small air tools, with 20-90 microns filtration, preferably 40 micron filtration. We have found that the device 20 operates best when it is kept clean and is properly lubricated and that it should be pulled forward at a substantially constant speed, preferably not exceeding ½ foot per second, and the speed can be much lower, if desired. The maximum speed can be much lower, if desired. The maximum speed is normally used only when no obstruction is encountered. When an obstruction is encountered, the forward progress of the device 20 is slowed down substantially, while maintaining a substantially constant pulling force, preferably not exceeding 1500 pounds, so that the device 20 can work its way through the problem area. There is no need to increase the pulling force or the pulling speed, and in fact to do either, defeats the beneficial effects of the device.

Before starting, the entire run between manholes should be cleared to remove large rocks, accumulations of dirt, and other debris. The remaining dirt and debris will be ejected by the pneumatic nozzles 40 near the front.

FIG. 4 shows an overbelled pipe joint 60. A pipe section 61 has a spigot 62, while a pipe section 63 has a bell 64 with a tapered connecting portion 65. The bell 64 has an end 66 and an annular recess 67 with a sealing gasket 68 therein. The spigot 62 should have stopped short of the portion 65, but, having been pushed in too far, has gone past the portion 65 into the pipe 63 proper, resulting in an inturned end 70 where the spigot should have remained cylindrical. Very few joints are overbelled in any pipeline, but those few need correction, both to pass the required tests and to assure proper flow of sewage.

The device 20 is moved through the pipe 61, preferably in the upgrade direction, and is vibrated as described earlier. Thus, the pipe 61 is vibrated and therefore loosened, so that its natural tendency for the portion 70 to receive its original cylindrical shape combined with its loosening and with the vibration causes the pipe 61 to move in the direction of the arrow 71 (or the pipe 63 to move in the opposite direction, or both) until the spigot 62 can receive its full cylindrical shape inside the bell 64 and not extend beyond it. The vibratory action may be accompanied in the more difficult cases by actual contact with and mechanical force against the spigot 62 when the device 20 reaches it, so that in any event the overbelling is overcome and integrity of the joints assured.

The device 20 can also be used as a primary compaction tool, as shown in FIG. 5 to enhance compaction of a trench section, as well as in the bedding and haunching area in pipes which have been normally installed. This lengthens the life of the pipe system and prevents its having to be dug up for repair. In this instance, an upstream manhole 75 is filled with water, and the device 20 is pulled to move from a downstream manhole 76 toward the upstream manhole 75, while water 77 flows downstream around the unit 20. The water enables the device to transmit the maximum vibratory effects through to the pipe wall in all directions and into the soil matrix 78. If desired, this system may be used when the pipe needs to be re-rounded, as well as when the pipe is properly round but compaction of the soil to the pipe zone is still needed. In this instance, the grading along the bottom 80 of the trench will be smoothed and the pipe evenly graded so that it will be accurately aligned and will pass the light ray test and the television test.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A device for gauging and, if necessary, re-rounding flexible conduits after generally horizontal, inclined installation below ground and after the conduits have been covered with soil and compacted, so that the upper conduit wall may have been subjected to deflection, including in combination:

a casing assembly comprising (1) a central cylindrical tubular gauging portion nearly as great in diameter as the conduit, (2) a tapered forward tubular nose portion welded to the forward end of the said central portion and having an end wall with first means for attachment of a pulling cable, said tubular nose portion having air outlet openings extending forwardly at a relatively small angle to the longitudinal axis of said central portion, and (3) a narrower rear portion welded to the rear end of said central portion located eccentrically with respect to said central portion to provide continuity along the bottom of said casing assembly but recessed at the sides and top, said rear portion having a vertical rear end wall with second means for attachment of a cable and an air inlet opening, an air-jet-driven ball-type vibrator in said rear portion having a housing enclosing a vertically disposed, circular, flat, disc-like chamber with flat side walls, extending lengthwise of said rear portion, said chamber having a tangential inlet parallel to the longitudinally extending outlet facing said rear end wall, with a steel ball in said chamber moved by said air around said chamber to cause a vibrating action in a longitudinal vertical plane, air inlet means extending through said air inlet opening into said tangential inlet, and a support plate for said housing, secured rigidly to said housing and to the lower portion of said rear portion for transmitting the vertical vibrations to the bottom of said rear portion.

2. The device of claim 1 wherein said nose portion comprises:

a first cylindrical portion smaller in diameter than said gauging portion and welded thereto, a tapered portion secured to said first cylindrical portion and decreasing in diameter forwardly, and a second cylindrical portion secured to the smaller-diameter end of said tapered portion, and a vertical said end wall at the forward end of said second cylindrical portion having an exterior pull ring comprising said first means for attachment.

3. The device of claim 2 wherein said air outlet openings are located approximately at the juncture of said first cylindrical portion and said tapered portion.

4. The device of claim 3 wherein said air outlet openings comprise a series of circumferential openings inclined outwardly at about 14° to the axis of said device.

5. The device of claim 1 wherein said rear portion is cylindrical and of smaller diameter than said central portion.

6. The device of claim 1 wherein said air inlet opening lies above the center of said rear portion and said second means for attachment comprises a pull ring below said center.

7. The device of claim 1 wherein said air inlet means includes an air filter.

* * * * *